Dec. 1, 1959  G. PRINS  2,915,746
RADAR RELAY FOR TRANSMITTING RADAR IMAGES
Filed Nov. 5, 1953  3 Sheets-Sheet 1

INVENTOR
GERHARD PRINS
BY
AGENT

United States Patent Office 2,915,746
Patented Dec. 1, 1959

2,915,746
RADAR RELAY FOR TRANSMITTING RADAR IMAGES

Gerhard Prins, Noordwijk, Netherlands, assignor, by mesne assignments, to North American Philips Company, Inc., New York, N.Y., a corporation of Delaware Application November 5, 1953, Serial No. 390,311

Claims priority, application Netherlands November 11, 1952

6 Claims. (Cl. 343—6)

The invention relates to a radar relay comprising a transmitter and a receiver for transmitting radar plan-position-indication images, in which in each period of the radial scanning a preliminary pulse, the video signal and an alternating directional voltage are transmitted in succession.

The invention has for its object to provide for such a radar relay a suitable method of transmitting the alternating directional voltage and the preliminary pulses requiring only comparatively simple apparatus. In addition, the effects of interferences in the transmission path, for example, atmospheric interferences, are drastically reduced.

For transmitting the alternating directional voltage and the preliminary pulses the transmitter of the radar relay according to the invention comprises a pulse-duration modulator controlled by the alternating directional voltage and the preliminary pulses for producing duration-modulated pulses to be emitted in each scanning period. The leading edge of the modulated pulse is modulated in position by the alternating directional voltage and the trailing edge coincides with the preliminary pulse. In the receiver the incoming signals are supplied to a separator for the alternating directional voltage, comprising in succession an integration circuit, a threshold device and a trigger circuit. The output voltage, constituted by duration-modulated pulses, controls a pulse-duration demodulator to regain the alternating directional voltage. The incoming signals are also supplied to a preliminary-pulse separator comprising a differentiation circuit, a gate circuit controlled by the output pulses of the trigger circuit of the separator for the alternating directional voltage and a pulse repeater controlled by the preliminary pulses produced across the output of this gate circuit.

In order that the invention may be readily carried into effect, it will now be described with reference to the accompanying drawing, in which.

Figure 1:
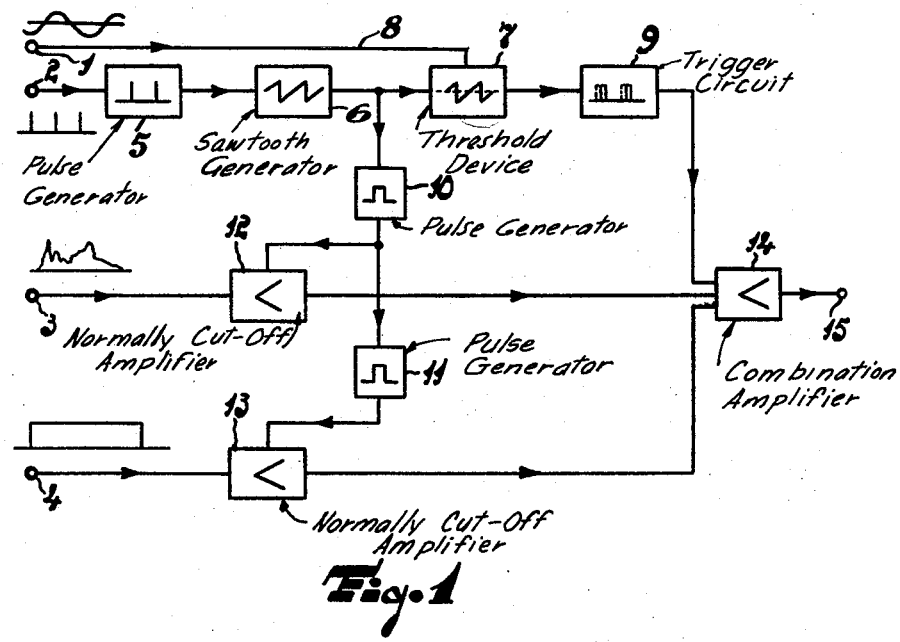
Figs. 1 and 2 show block diagrams of the transmitter and the receiver respectively of the radar relay according to the invention.
Figure 2:
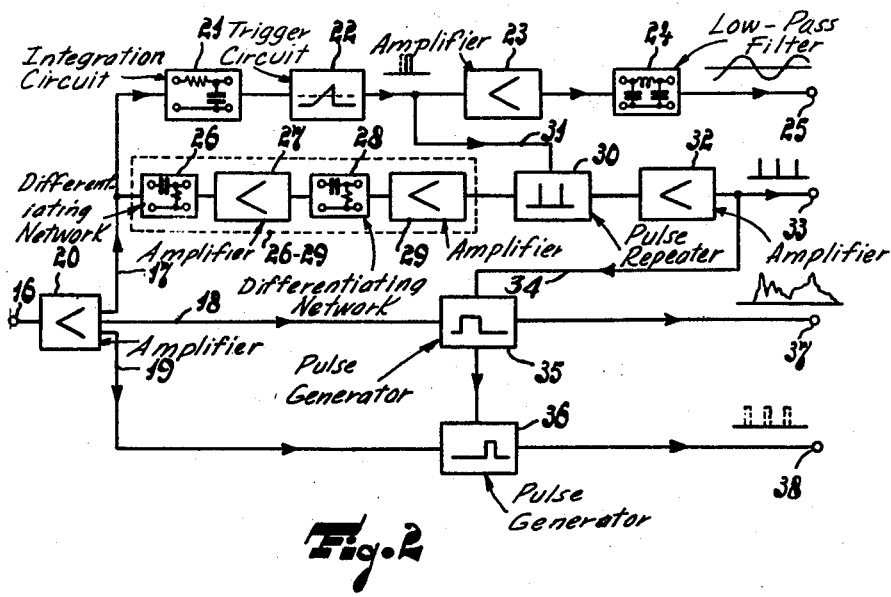
Figure 4:
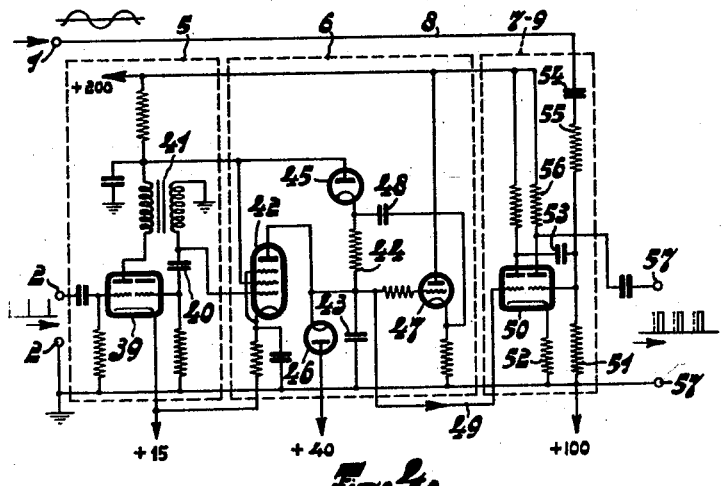
Figs. 4 and 5 show detail diagrams of preferred embodiments of those parts of the transmitter and the receiver respectively shown in Figs. 1 and 2, which are important for a good understanding of the invention.
Figure 5:
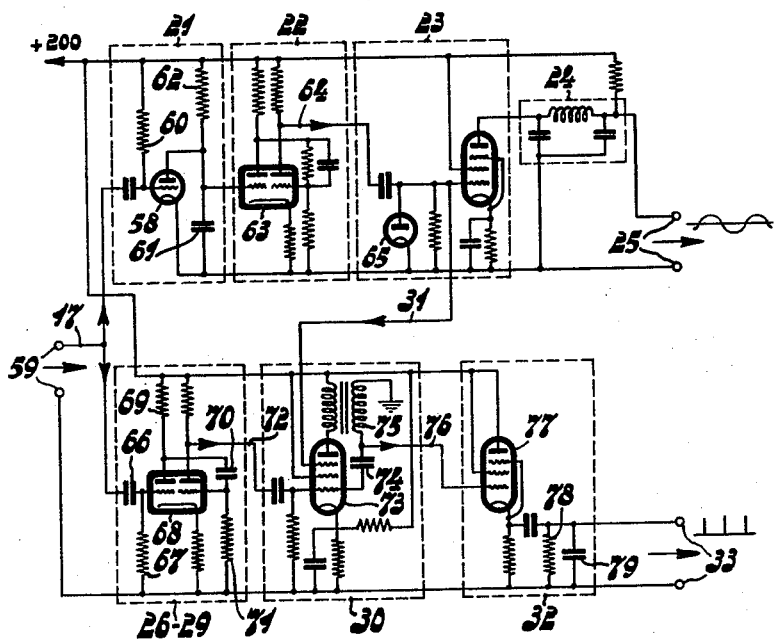

Corresponding parts shown in Figs. 1 and 2 and in Figs. 4 and 5 are designated by the same reference numerals.

The transmitter shown in Fig. 1 is arranged for combining three data characteristic of the image, i.e. an alternating directional voltage, the preliminary pulses and the video signal, in each radial scanning of the radar plan-position-indication image in time division, these voltages being supplied to the input terminals 1, 2 and 3 respectively.

The alternating directional voltage, the frequency of which may, for example, be 60 c./s., is a multiple of the speed of revolution of the radial scanning of the plan-position indication image, for example, 20 revolutions per minute. Since this alternating directional voltage of 60 c./s. is transmitted in single phase, it is necessary, as is known per se, to emit also a signal indicating, for example, the north direction of the scanning pattern. For this purpose a north indicating pulse is supplied to the input terminal 4 during, for example, 10 to 20 successive radial scannings of the P.P.I.-image in the northern direction, these scannings occupying together, for example, an angular space of ½ to 1°. The various input voltages are indicated at the respective input terminals.

The input voltages supplied to the terminals 1 to 4 are combined as follows:

The preliminary pulses fed to the terminal 2, having a time interval of 360 μsec. (repetition frequency 2778 c./s.) synchronize a pulse generator 5, which supplies strong, but very short pulses of 1/10 μsec., as indicated in Fig. 3a. These pulses synchronize the fly-back of a sawtooth generator 6, the output voltage of which is indicated at $e_1$ in Fig. 3b. The sawtooth output voltage $e_1$ is fed to a threshold device 7 supplied via conductor 8, with a threshold voltage constituted by a direct voltage and an alternating directional voltage superimposed thereon. The resultant threshold voltage is indicated in Fig. 3b by the broken curve $e_2$. The voltage fluctuates between the limits $e'_2$ and $e''_2$.

Only those parts of the sawtooth voltage $e_1$ which exceed this threshold voltage produce a voltage at the output of threshold device 7 and thus cause a trigger circuit 9, controlled by this output voltage, to produce pulses $e_3$ of Fig. 3c, corresponding in duration with the portion of the sawtooth voltage passed through the threshold device. The time when the trailing edge of these pulses $e_3$ occurs, coincides with the trailing edge of the sawtooth and thus with the preliminary pulses.

The time when the leading edge occurs varies with the instantaneous value of the alternating directional voltage $e_2$ between 260 and 310 μsec., measured from the time of the preliminary pulse in Fig. 3c. The leading edge thus modulated in time and the trailing edge occurring at a fixed instant produce a duration-modulated pulse. It should be noted here that the fly-back of the sawtooth voltage must be very steep, its steepness being, for example, 5000 times greater than that of the sawtooth edge, in order to prevent the instant of the trailing edge of the duration-modulated pulses obtained from exhibiting a disturbing position-modulation.

The sawtooth voltage derived from the sawtooth generator 6 controls two cascade-connected pulse generators 10 and 11. The first generator supplies a gating pulse extending from 5 to 160 μsec. (cf. time scale Fig. 3c) and serves to release, i.e. to place in operative condition, a normally cut-off amplifier 12 for the video signals supplied through the terminal 3 ($e_4$ in Fig. 3c).

The pulse generator 11 supplies pulses extending from 200 to 210 μsec. after the instant of the preliminary pulse, to the amplifier 13. This amplifier is normally cut-off and is released, i.e. placed in operative condition, by a so-called north contact to pass on the pulses supplied as north pulses ($e_5$ in Fig. 3c).

The duration-modulated pulses of the trigger circuit 9, the video signals of the amplifier 12 and the north pulses of the amplifier 13 are fed to a combining amplifier 14, comprising an output terminal 15, the output voltage of which is thus constituted as is indicated in Fig. 3c. In each period T of 360 μsec. there occur in succession:

(1) The instant of the preliminary pulse (instant 0 in Fig. 3c) as the trailing edge of a comparatively long pulse $e_3$;

(2) The video signal $e_4$ in the time of 5 to 160 μsec.;

(3) The north pulse $e_5$ (of 200 to 210 μsec.) during the scanning in the northern direction;

(4) The alternating directional voltage as a position-modulated leading edge of the pulses $e_3$ between 260 to 310 μsec.

The resultant combination signal is transmitted via a co-axial cable, a radio communication or the like to the receiver shown in Fig. 2 in a block diagram, in which the four combined signals must be separated.

The incoming signals are supplied via an input terminal 16 to an amplifier 20 comprising a plurality of relatively decoupled output conductors 17, 18 and 19. The output conductor 17 is connected to a separator for the alternating directional voltage, to be described first hereinafter and to the separator for the preliminary pulses.

The signal derived from the amplifier 20 via the conductor 17 is the signal indicated in Fig. 3c, which is supplied to the separator for the alternating directional voltage, this separator beginning with an integration circuit 21. This integration circuit has a long charging time constant relative to the discharging time constant, so that only the long pulses $e_3$ of Fig. 3c produce an appreciable voltage at the integration capacitor, as is indicated in Fig. 3d at $e_6$. The voltage variation indicated by broken lines at $e'_6$ and $e''_6$ applies to the minimum duration and the maximum duration respectively of the duration-modulated pulses $e_3$. The voltage at the integration capacitor due to the video signals $e_4$ and the north pulse $e_5$ of Fig. 3d is indicated at $e_7$ and $e_8$ respectively in Fig. 3d.

The output voltage of the integration circuit controls a trigger circuit which responds only when the input voltage exceeds a suitable threshold value of Fig. 3d. The video signals and the north pulses are suppressed in the output circuit of this trigger circuit, so that only duration-modulated pulses $e_{10}$ occur with a minimum duration and a maximum duration as indicated at $e'_{10}$ and $e''_{10}$. The pulses $e_{10}$ have shorter duration than the incoming pulses $e_3$. The leading edges of these short pulses $e_{10}$ exhibit, however, the same position modulation as the leading edges of the incoming pulses. The trailing edges are slightly delayed (for about 2 to 4 μsec.) relatively to the trailing edges of the pulses $e_3$ and exhibit, moreover, a certain degree of position modulation, so that they cannot be used for the indication of the instant of the preliminary pulses.

In order to regain the alternating directional voltage, the duration-modulated pulses ($e_{10}$ of Fig. 3d) are supplied via an amplifier 23 to a low bandpass filter 24, operating as a pulse-duration demodulator. The output circuit of filter 24 is connected to the output terminal 25 for the alternating directional voltage.

The preliminary-pulse separator begins with a differentiating network 26, connected to the conductor 17, so that the incoming signals indicated in Fig. 3c are converted into the signals indicated in Fig. 3f. The latter are supplied via a separation amplifier 27 to a second differentiating network 28, the significant component of the output voltage of which is indicated in Fig. 3g. The voltage thus obtained by double differentiation of the incoming signals controls a pulse repeater 30 via a further separation amplifier 29 this pulse repeater being utilized at the same time as a gating circuit. The pulse repeater 30 is normally cut-off and is released by the output pulses of the trigger circuit 22, serving as gating pulses and supplied through the conductor 31, these pulses being indicated at $e_{10}$ in Fig. 3e already referred to. These pulses have a shorter duration than the duration-modulated incoming pulses. As is evident from Fig. 3g only the positive-going and negative-going voltage pulses $e_{11}$ and $e_{12}$ respectively, derived from the trailing edges of the duration-modulated incoming pulses $e_3$ of Fig. 3c occur during these gating pulses.

The positive-going pulse $e_{11}$ causes the pulse repeater 30 to respond. The output pulses of repeater 30 ($e_{13}$ of Fig. 3h) coincide with the trailing edges of the incoming pulses $e_3$ of Fig. 3c. The resultant pulses are supplied via an output amplifier 32 to the output terminal 33 for the preliminary pulses.

It should be noted that in the case of radio transmission of the signals indicated in Fig. 3c interference may be superimposed on the incoming pulses $e_3$, which interference may give rise to the occurrence of other voltage pulses than $e_{11}$ and $e_{12}$ during the gating pulses of Fig. 3e. It has been found in practice that this phenomenon has substantially no disturbing effect, since the leading instant of a preliminary pulse produces a wrong reproduction of only a single radial scanning. If provisions should be made for the regular occurrence of abnormally strong interference pulses, for example, due to neighbouring radar systems, the disturbing effect on the relayed radar image may be drastically reduced by limiting the incoming signals in the amplifier 20. Any residual interference pulses will then have a comparatively small amplitude and may be suppressed by a class C amplifier, operating as a threshold device.

The preliminary pulses occurring at the output terminal 33 are supplied via the conductor 34 to two cascade-connected gating pulse generators and amplifiers 35 and 36. The gating pulses operating in these amplifiers are indicated by $e_{14}$ and $e_{15}$ respectively in Fig. 3h. Owing to the use of these gating pulses only the video signals and the north pulses of the signals supplied to the amplifiers 35 and 36 are supplied to the output terminals 37 and 38 respectively.

Now the detail diagrams of the most important parts of Figs. 1 and 2 are explained with reference to Figs. 4 and 5 respectively.

Fig. 4 shows in detail the circuit 2, 5, 6, 7, 9, 1, 8 for producing the duration-modulated pulses.

The preliminary pulses are fed via the input terminals 2 to the left-hand part of a double triode 39, serving as an amplifier. The right-hand triode part is connected as an automatic cut-off pulse generator of a type known per se by coupling the control-grid via a capacitor 40 and a feed-back transformer 41 to the anode circuit. The right-hand triode is normally cut-off by a suitable positive cathode potential (+15 v.). A preliminary pulse supplied via the left-hand triode to the anode of the right-hand triode produces a very short pulse (of about 1/10 μsec. of Fig. 3a) in the right-hand triode portion, this pulse being derived from the grid circuit and supplied to a pentode 42 of the sawtooth generator 6. This sawtooth generator comprises relaxation capacitor 43 which is connected to a source of anode voltage (+200 v.) through a charging resistor 44 and a diode 45. Parallel to the relaxation capacitor is connected the pentode 42, which is normally cut-off and discharges very rapidly the relaxation capacitor each time when an input pulse occurs. The sawtooth voltage at the relaxation capacitor 43 has a variation as shown in Fig. 3b. In order to fix the minimum voltage at the relaxation capacitor 43, it is connected via a diode 46 to a source of positive voltage of +40 v.

In order to linearize the sawtooth voltage the voltage at the relaxation capacitor 43 is fed back via a cathode-follower 47 and a feed-back capacitor 48 to the end of the charging resistor 44 remote from capacitor 43. Diode 45 permits an increase in voltage at this end of the resistor in excess of the voltage applied to the anode of the diode.

The resultant sawtooth voltage is supplied through a conductor 49 to a trigger circuit 7, 9, operating as a threshold device and comprising a double triode 50. A positive bias voltage of +100 v. is applied to the grid of the right-hand triode via a grid resistor 51, so that this triode is conductive in normal operation. The voltage thus occurring across a common cathode resistor 52 suffices to keep the left-hand triode cut-off until the voltage at the relaxation capacitor 43 exceeds a definite minimum value determined by the choice of the bias voltage. As soon as this minimum value is exceeded, the left-hand triode becomes conductive and owing to the feed-back capacitor 53 between the anode of the left-hand triode and the grid of the right-hand triode the trigger circuit flops over, so that the left-hand triode is conductive and the right-hand triode is cut-off. The trigger circuit flops back into the initial position during the flyback of the sawtooth voltage.

The first-mentioned change-over of the circuit occurs as soon as the leading edge of the sawtooth voltage $e$ of Fig. 3b exceeds a definite minimum value. However, this minimum value varies with the bias voltage applied to the grid of the right-hand triode. By applying to this grid, via the input terminal 1, the conductor 8 and the coupling capacitor 54 and the series resistor 55, the said bias voltage and the alternating directional voltage, the said minimum value varies as is indicated in Fig. 3b at $e_2$ between the limits $e'_2$ and $e''_2$. Thus, duration-modulated positive pulses as indicated at $e_3$ in Fig. 3c occur across an anode resistor 56 of the right-hand triode (in the rhythm of the alternating directional voltage). These pulses may be derived from output terminals 57 and combined with the video signals and the north pulses in order to obtain the combined signals indicated in Fig. 3c, which are transmitted.

Fig. 5 shows a detail diagram suitable for use on the receiver side for the separation of the alternating directional voltage and the preliminary pulses.

Figure 3:
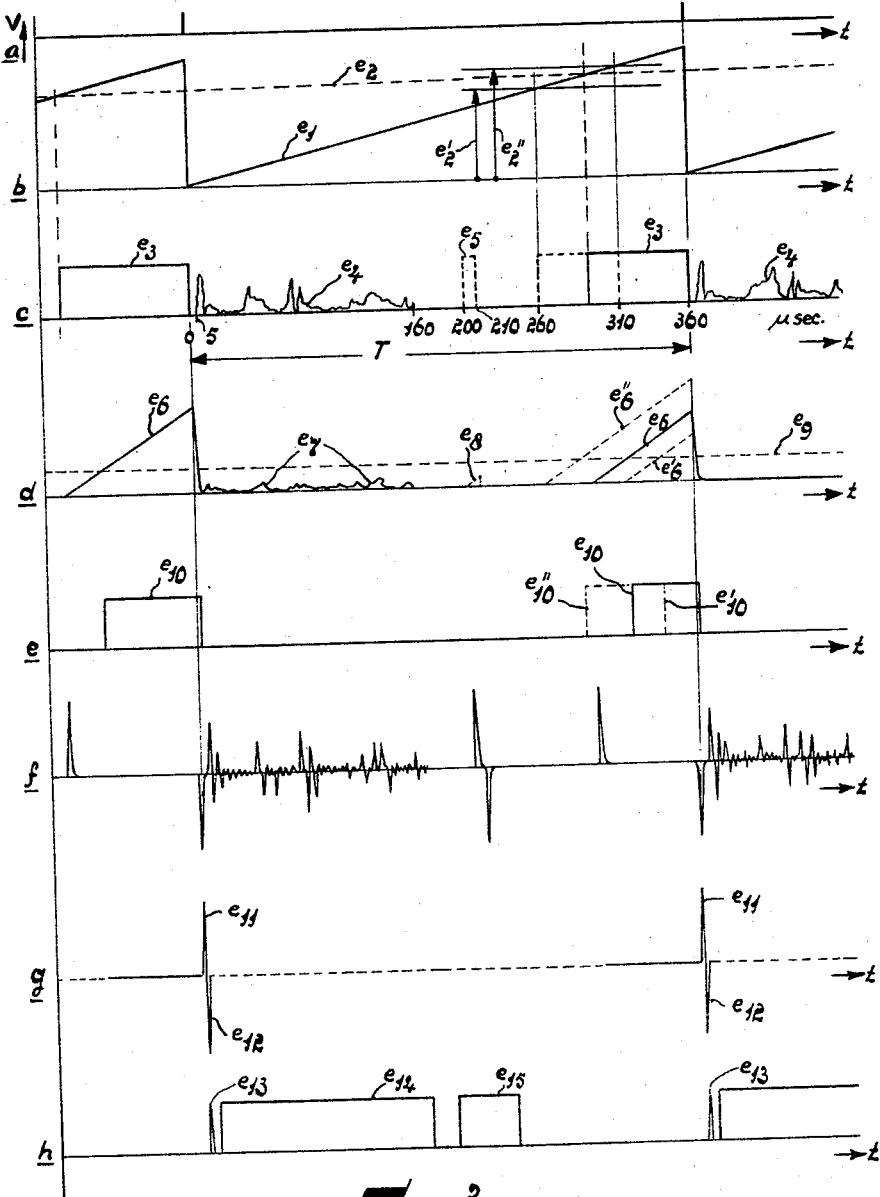
Figs. 3a to 3h show voltage-time diagrams to explain the operation of the radar relay.

The separator for the alternating directional voltage comprises an integration circuit 21, having a triode 58. The incoming signals are supplied to the control-grid of triode 58 with negative polarity through input terminals 59 and the supply conductor 17. Via a grid resistor 60 the control-grid is connected to the source of anode voltage (+200 v.) and hence, a comparatively high grid current and a maximum anode current flow in the absence of input signals. The triode is connected in parallel with an integration capacitor 61, which is connected through an anode resistor 62 to the anode voltage source. If the triode is conductive, the voltage across the integration capacitor has a minimum value; if the triode is cut-off, the voltage across the integration capacitor rises comparatively slowly and drops rapidly when the triode becomes conductive. The amplitude of the signals applied to the control-grid is chosen to be such that the triode is exactly cut-off by the duration-modulated pulses. Thus the voltage indicated in Fig. 3 is produced across the integration capacitor; this voltage reaches an appreciable value only during the duration-modulated pulses indicated at $e_6$.

The voltage across the integration capacitor 61 controls a trigger circuit, operating as a threshold device and comprising a double triode 63. This trigger circuit is of the type already described with reference to Fig. 4 (7, 9) however, in this case use is made of a fixed positive bias voltage for the right-hand triode portion. This trigger circuit 22 supplies the duration-modulated pulses indicated at $e_{10}$ in Fig. 3d, which are fed via the conductor 64 to a pentode amplifier 23, the control-grid circuit of which includes a diode 65, fixing the direct-voltage level. The anode circuit of the pentode includes a low bandpass filter 24, which suppresses the pulse repetition frequency and operates as a pulse-duration demodulator. The resultant alternating directional voltage thus separated out may be derived from the terminals 25.

The incoming signals fed to the input terminals 59 are supplied via the conductor 17 also to the separator for the preliminary pulses 26—30.

These are applied via a first differentiating network comprising a capacitor 66 and a resistor 67 to the control-grid of a first separation amplifier, constituted by the left-hand triode of a double triode 68. The voltage across the anode resistor 69 (Fig. 3f) is supplied via a second differentiating network comprising a capacitor 70 and a resistor 71 to a second separation amplifier constituted by the right-hand triode of the double triode 68 and, subsequent to amplification (Fig. 3g) it is applied to the pulse repeater 30 via the conductor 72. This repeater comprises a pentode 73, normally cut-off by a negative control-grid bias voltage. The control-grid of tube 73 is connected via a separation capacitor 74 and a feed-back transformer 75 to the anode circuit in order to constitute an automatically cutting-off pulse generator.

The suppressor grid of this pentode is connected to the control-grid circuit of the amplifier 23 of the separator for the alternating directional voltage, this control-grid being at earth potential owing to the presence of the diode 65 only during the pulse supply and having a negative voltage of for example —70 v. in the absence of pulses. Consequently, this negative voltage occurs at the suppressor grid of the pulse-generator tube 73, which is thus cut-off. Only during the pulses of the separator for the alternating directional voltage operating as gating pulses, the pulse repeater can operate as such and is then made operative by the positive pulses indicated at $e_{11}$ in Fig. 3g.

The output pulses of the pulse repeater 30 are supplied via a conductor 76 to an output amplifier 32, comprising a cathode follower 77, the output circuit includes a shunt resistor and a shunt capacitor 78 and 79 respectively in order to correct the pulse shape. The resultant pulses may be derived from output terminals 33 and constitute the separated preliminary pulses.

What is claimed is:

1. A radar relay for conveying plan-position indication images constituted by successive signal components including a preliminary pulse, a video signal and an alternating directional voltage, said components being repeated in each period of a radial scanning comprising a transmitter section for transmitting said plan-position-indication signal components including a pulse-duration modulator for producing a first duration-modulated pulse, means for applying said alternating directional voltage to said modulator for position-modulating the leading edge of said duration-modulated pulse, means for applying said preliminary pulse to said modulator to effect the occurrence of the trailing edge of said duration-modulated pulse; and a receiver section including circuit means for intercepting said duration-modulated pulse, an alternating directional voltage separating circuit coupled to said means and including successively an integrating circuit, a threshold device and a trigger circuit for producing a second duration-modulated pulse and a pulse-duration demodulator controlled by said second duration-modulated pulse for reproducing the alternating directional voltage, and a preliminary pulse separator also coupled to said circuit means, said pulse separating circuit including successively a differentiation circuit, a gating circuit for reproducing the preliminary pulse and controlled by the second duration-modulated pulse of said trigger circuit, and a pulse repeater controlled by the preliminary pulse of said gating circuit.

2. A radar relay, as set forth in claim 1, wherein said pulse-duration modulator includes a sawtooth generator synchronized by the preliminary pulses and providing a sawtooth output voltage, and a comparator for providing a comparison voltage varying with the alternating directional voltage for obtaining duration-modulated pulses, said comparator having a first input connected to receive said alternating direction voltage and a second input connected to receive said sawtooth voltage and adapted to produce an output voltage whenever said sawtooth voltage exceeds said alternating directional voltage.

3. A radar relay, as set forth in claim 1, wherein said integrating circuit includes a resistor, a capacitor connected via said resistor to a charging voltage source and an electron discharge device having a control grid and a circuit therefor connected across said capacitor, said device having a control grid and a circuit therefor and being in a normally conductive state and further including means for applying the received duration-modulated pulse to the control grid of said device in a polarity effecting non-conduction of said device during the occurrence of said duration-modulated pulse.

4. A radar relay, as set forth in claim 1, wherein said differentiation circuit includes an amplifier and two differentiation networks connected in cascade via said amplifier.

5. A radar relay, as set forth in claim 4, further including a limiter connected in said means for receiving the duration-modulated pulse at the input of said differentiation circuit.

6. A radar relay, as set forth in claim 1, wherein said gating circuit and pulse repeater comprise a pulse generator having an electron discharge device having a plurality of grids, the output of said differentiation circuit being coupled to one of said grids and the output of said trigger circuit being coupled to another of said grids to provide a gating pulse for said device.

References Cited in the file of this patent

UNITED STATES PATENTS

| | | |
|---|---|---|
| 2,227,108 | Roosenstein | Dec. 31, 1940 |
| 2,268,001 | Von Fegel-Farnholz | Dec. 30, 1941 |
| 2,274,829 | Goddard | Mar. 3, 1942 |
| 2,391,776 | Fredendall | Dec. 25, 1945 |
| 2,420,374 | Houghton | May 13, 1947 |
| 2,523,279 | Chatterjea | Sept. 26, 1950 |
| 2,539,905 | Herbst | Jan. 30, 1951 |
| 2,570,249 | Kenyon | Oct. 9, 1951 |
| 2,626,390 | Duke | Jan. 20, 1953 |
| 2,655,649 | Williams | Oct. 13, 1953 |